(12) United States Patent
Hasan et al.

(10) Patent No.: US 8,432,126 B2
(45) Date of Patent: Apr. 30, 2013

(54) RAPID OFFBOARD CHARGING VIA SELECTIVE ENERGIZING OF DESIGNATED SEMICONDUCTOR SWITCHES AND INDUCTION COILS IN AN ELECTRIC OR HYBRID ELECTRIC VEHICLE

(75) Inventors: S. M. Nayeem Hasan, Novi, MI (US); David P. Tasky, Farmington Hills, MI (US); Mohammad N. Anwar, Van Buren Township, MI (US); Sean E. Gleason, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 380 days.

(21) Appl. No.: 12/878,260

(22) Filed: Sep. 9, 2010

(65) Prior Publication Data

US 2012/0062176 A1  Mar. 15, 2012

(51) Int. Cl.
*H01M 10/44* (2006.01)
*H01M 10/46* (2006.01)

(52) U.S. Cl.
USPC .......................................................... 320/104

(58) Field of Classification Search .................. 320/104, 320/107, 128, 160; 180/65.21, 35.26, 65.285, 180/65.31
See application file for complete search history.

(56) References Cited

U.S. PATENT DOCUMENTS

| | | | |
|---|---|---|---|
| 5,341,075 A | | 8/1994 | Cocconi |
| 6,886,647 B1 * | | 5/2005 | Gotta ............................ 180/65.1 |
| 2006/0250114 A1 * | | 11/2006 | Faberman et al. ............... 322/24 |
| 2010/0013438 A1 | | 1/2010 | Anwar et al. |
| 2010/0096926 A1 | | 4/2010 | King et al. |
| 2011/0231034 A1 * | | 9/2011 | Kinser et al. ....................... 701/2 |
| 2012/0112674 A1 * | | 5/2012 | Schulz et al. ............ 318/400.09 |

* cited by examiner

*Primary Examiner* — Edward Tso
(74) *Attorney, Agent, or Firm* — Quinn Law Group, PLLC

(57) ABSTRACT

A vehicle includes an energy storage system (ESS) rechargeable using electrical power from an off-board AC power supply, a traction power inverter module (TPIM), one or two motors, and a controller. The TPIM has two inverters. The controller energizes designated semiconductor switches of the TPIM and designated induction coils of the motor to boost electrical power from the AC power supply for charging the ESS when the vehicle is not running. With two motors, a contactor allows induction coils of a first motor to be connected to the switches of the first inverter as an input filter, and an additional semiconductor switch is positioned between the ESS and an output side of the switches of the second inverter. A controller charges the ESS by energizing designated semiconductor switches of the TPIM and induction coils of the motor to charge the ESS without using an onboard battery charger module.

14 Claims, 5 Drawing Sheets

RAPID OFFBOARD CHARGING VIA SELECTIVE ENERGIZING OF DESIGNATED SEMICONDUCTOR SWITCHES AND INDUCTION COILS IN AN ELECTRIC OR HYBRID ELECTRIC VEHICLE

TECHNICAL FIELD

The present invention relates to an integrated charger-inverter for rapidly charging a high-voltage battery of the type used for energizing a permanent magnet/induction-type vehicle drive motor aboard an electric or hybrid electric vehicle.

BACKGROUND

Electric vehicles (EV) and plug-in hybrid electric vehicles (PHEV) use a rechargeable energy storage system (ESS) to deliver electrical power to one or more permanent magnet/induction-type drive motors. The motors alternately draw power from and deliver power to the ESS as needed. Other major electrical components of an EV and PHEV powertrain are a traction power inverter module, a DC/DC converter, and a high-voltage on-board battery charging module. The battery charging module is plugged into a standard 120VAC or 220VAC power outlet to recharge the ESS when the vehicle is not running.

SUMMARY

Accordingly, a vehicle is provided herein which dispenses of the separate on-board battery charging module noted above. Instead, the vehicle uses designated high-power semiconductor components and induction coils of one or two permanent magnet/induction-type drive motors to rapidly charge the energy storage system (ESS). A conventional on-board battery charging module lacks practical utility when the vehicle is not being charged, and therefore its use adds dead weight to the vehicle. Moreover, such battery charging modules provide a relatively low charging power of approximately 1.2 kW to approximately 3.3 kW, which in turn extends the charging time. Using a 220VAC power outlet during a charging operation can reduce the total charging time relative to a 120VAC supply. However, the charging rate is still limited by the relatively low power output of most off-the-shelf on-board battery charging modules. Moreover, 220VAC power supplies are generally not as readily available as the slower 120VAC supplies.

Two recharging circuits or topologies are disclosed herein, one for each of a two-motor and a one-motor vehicle drive configuration. Each topology dispenses entirely of the on-board battery charging module, and instead provides a rapid charging operation for the ESS using designated high-power semiconductor switches of a dual-inductor traction power inverter module (TPIM) and designated induction coils of one or two motors. The TPIM and motor(s) would be idle when an on-board battery charging module is in operation. Therefore, these devices can be used to provide a buck-boost or pure boost operation for rapidly charging the ESS.

In particular, a vehicle is provided herein having a high-voltage ESS which is rechargeable using electrical power from an off-board AC power supply, a TPIM having two inverters each with a plurality of semiconductor switches, a motor, and a controller. The motor is configured as a permanent magnet/AC induction machine having a plurality of induction coils. The controller, e.g., a motor control processor or other suitable device, selectively energizes designated semiconductor switches of the TPIM and designated induction coils of the motor to boost the electrical power from the off-board AC power supply, and to thereby rapidly charge the ESS.

The first topology is used to provide a buck-boost circuit for boosting the electrical power when the vehicle has two drive motors, for example when the vehicle is configured as a plug-in hybrid electric vehicle (PHEV). When the vehicle is a battery electric vehicle (BEV) having just one drive motor, a second topology is used, with neither topology requiring or at any time using an additional/separate on-board battery charging module. The first topology adds a pair of additional power switches, e.g., a solid state device such as a relay or a contactor and an additional semiconductor switch. The second topology lacks the additional drive motor, and provides a pure boost circuit for boosting the electrical power using an input filter in lieu of using induction coils of the omitted second drive motor.

A controller is also provided for charging the ESS using electrical power from an off-board AC power supply. The controller includes a host machine programmed to or otherwise operable for selectively energizing designated semiconductor switches of the first and second inverters of the TPIM and designated induction coils of the motor in order to boost the electrical power from the off-board AC power supply, thereby rapidly charging the ESS when the vehicle is not running.

A method of charging the ESS includes using designated semiconductor switches of a first inverter of the TPIM to produce a rectified voltage from input power supplied from an off-board AC power supply. The method further includes using designated induction coils of the motor to generate an output voltage, with the output voltage being a function of the rectified voltage. The ESS is then charged using the output voltage.

A duty cycle of one of the designated semiconductor switches of the second inverter can be selected to control the output voltage used for charging the ESS. When the vehicle includes a second motor, a contactor is used in conjunction with designated induction coils of the second motor and designated semiconductor switches of the first inverter to produce the rectified voltage. An additional semiconductor switch is activated to transfer the rectified voltage to a link capacitor as the output voltage, thereby charging the ESS.

The above features and advantages and other features and advantages of the present invention are readily apparent from the following detailed description of the best modes for carrying out the invention when taken in connection with the accompanying drawings.

DESCRIPTION

Figure 1:
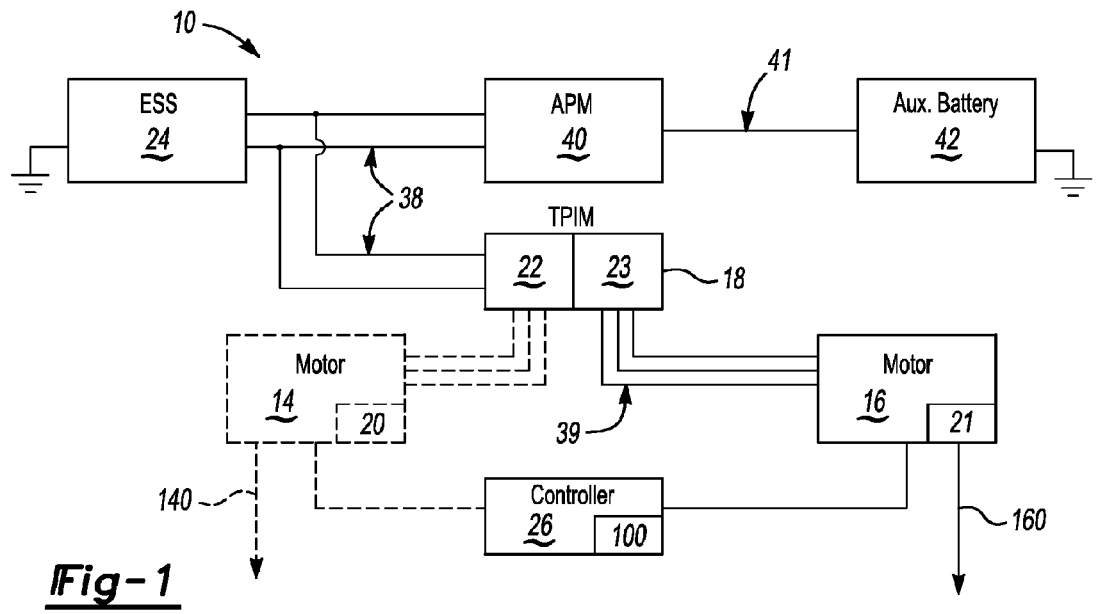
FIG. 1 is a schematic illustration of a vehicle having a controller which uses semiconductor switches of a dual-inverter TPIM and induction coils of one or two drive motors to rapidly charge a high-voltage energy storage system (ESS) as disclosed herein.

Referring to the drawings, wherein like reference numbers correspond to like or similar components throughout the several figures, a vehicle 10 is shown in FIG. 1 having a drive motor 16. An optional second driver motor 14 may also be used depending on the vehicle configuration. That is, in one possible embodiment the vehicle 10 can be configured as a plug-in hybrid electric vehicle (PHEV) using motor torque from both of the motors 14 and 16, with the motor torque being transmitted to respective motor output member 140 and 160. Torque from a designated motor, e.g., motor 14, can be harnessed to assist the cranking and starting of an internal combustion engine (not shown) in such an embodiment. Torque from either or both motors 14, 16 may be used for propelling the vehicle 10 via their respective output members 140 and 160. For simplicity, the engine, transmission, and final drive components are omitted from FIG. 1.

Alternatively, vehicle 10 may be configured as a battery electric vehicle (BEV) having just one motor, e.g., motor 16, and no engine. Either embodiment of vehicle 10 includes a traction power inverter module (TPIM) 18 having two power inverters 22, 23. A motor control processor or controller 26 may be electrically connected to motor 14 and/or 16 and adapted for controlling the speed, mode, and power flow to and from the motor(s). Controller 26 may be a single device as shown, or its functionality may be distributed between different devices. Additionally, a charging algorithm 100 resides within the controller 26 or is otherwise readily executable by the controller to rapidly charge a high-voltage energy storage system (ESS) 24 when the vehicle 10 is not running, and when the vehicle is electrically connected to an off-board AC power supply 50 as shown in FIGS. 2-5.

Two different circuit layouts or topologies are disclosed herein, one for each of the respective two-motor and one-motor embodiments noted above. In each topology, the vehicle 10, regardless of the number of motors it employs, is characterized by an absence of a conventional on-board high-voltage battery charger module. Instead, the controller 26 of vehicle 10 controls designated stator windings or induction coils 21 of motor 16 and designated semiconductor switches of the power inverters 22, 23 of the TPIM 18 in order to rapidly charge the ESS 24. When motor 14 is used, controller 26 designates certain induction coils 20 of the motor 14 to serve a power filtering function. Induction coils may be added as explained below with reference to FIGS. 4 and 5 to serve the same power filtering function when motor 14 is not included.

Still referring to FIG. 1, the motors 14 and 16 are multi-phase permanent magnet/AC induction-type electric machines each rated for approximately 60VAC to approximately 300VAC or more depending on the vehicle design. Motors 14, 16 are electrically connected to the ESS 24 via a high-voltage DC bus bar 38, the TPIM 18, and a multi-phase high-voltage AC bus bar 39. ESS 24 may be selectively recharged using motor torque from motors 14, 16 when the motors are actively operating as generators, e.g., by capturing energy during a regenerative braking event.

Other high-voltage electrical components of vehicle 10 may include an auxiliary power module (APM) 40, e.g., a DC-DC power converter, which is electrically connected to the ESS 24 via the DC bus bar 38. APM 40 may be electrically connected to a low-voltage auxiliary battery 42, e.g., a 12 VDC battery, via a low-voltage bus bar 41, and adapted for energizing one or more auxiliary systems (not shown) aboard the vehicle.

Figure 2:
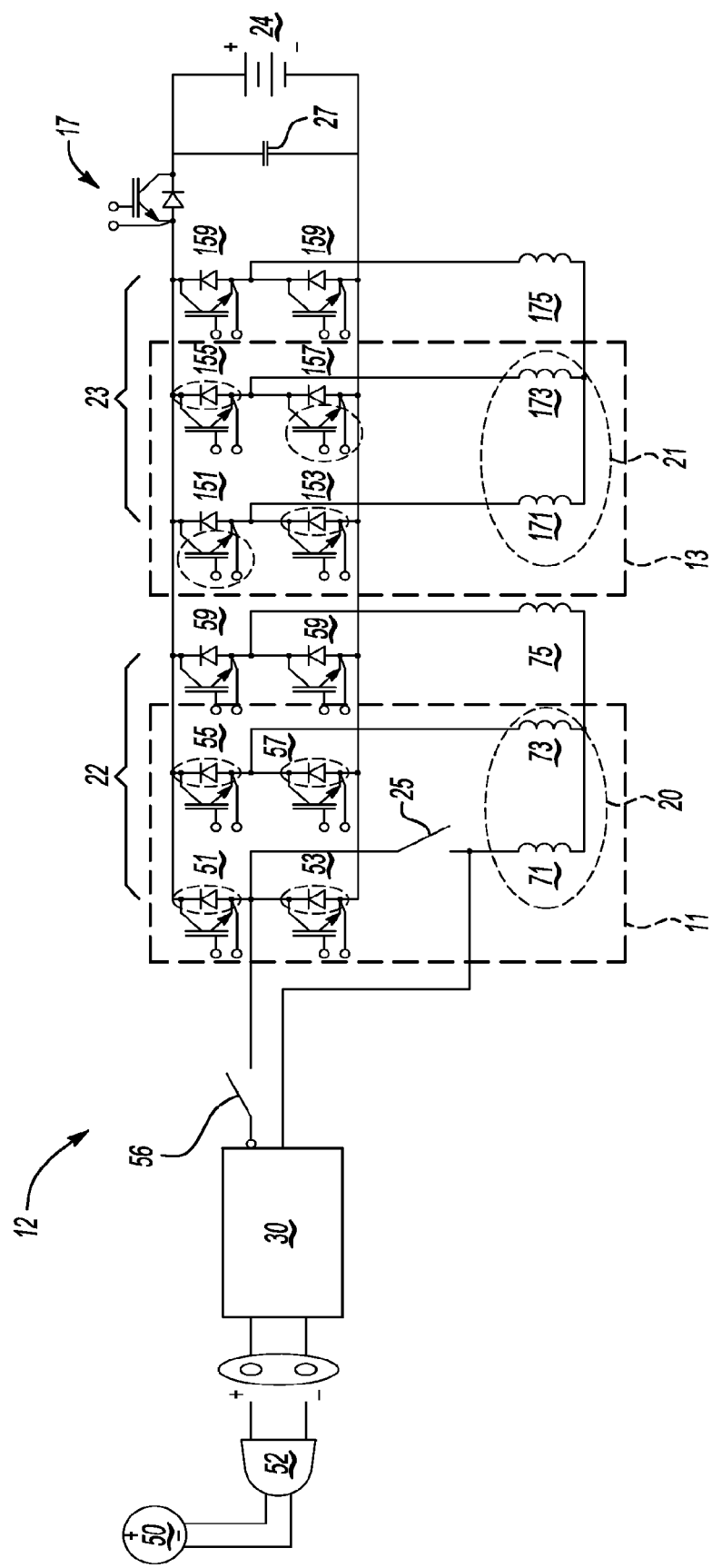
FIG. 2 is a schematic circuit diagram illustrating a first topology for charging the ESS of one possible embodiment of the vehicle shown in FIG. 1.

Referring to FIG. 2, a first topology 12 may be used with a two-motor drive system of the type described above, e.g., a PHEV using both of the motors 14 and 16 of FIG. 1. An off-board AC power supply 50 can be connected to the vehicle 10 via an electrical plug 52 to initiate plug-in charging of the ESS 24 when the vehicle 10 is not running, e.g., when parked in a garage at night. An optional input filter 30 can be used in conjunction with a contactor 56. Input filter 30 can include an electromagnetic compliance (EMC) filter and an induction coupling (not shown). Contactor 56 may be omitted if an EMC filter or induction coupling are not needed.

An additional semiconductor switch 17 and a contactor 25 are selectively controlled by controller 26 of FIG. 1, e.g., by transmitting an on/off signal to activate the respective devices when needed. The additional semiconductor switch 17 is electrically connected between the ESS 24 and the output side of the semiconductor switches 151, 153, 155, 157 of motor 16. Switch 17 and any other power switches used herein may be configured as an insulated-gate bipolar transistor (IGBT)-and-diode pair, a metal-oxide semiconductor field-effect transistor (MOSFET)-and-diode pair, or any other suitable power switch. For simplicity, IGBTs are shown herein in the various Figures. The contactor 25 may be configured as a solenoid contactor or other solid state switching device, although other switch designs, whether semiconductor or solid-state, may be used for the switch and/or contactor depending on the design and required switching performance.

Designated conduction coils 20 of motor 14 may include the induction coils 71 and 73. The remaining induction coil 75 is not designated for the charging operation. The contactor 25 electrically connects the designated induction coils of motor 14 to the semiconductor switches of inverter 22. Inverter 22 of TPIM 18 includes semiconductor switches 51, 53, 55, and 57. Semiconductor switches 51, 53, 55, 57 combine to form a rectifier circuit 11 in conjunction with the contactor 25 and induction coils 71 and 73 of motor 14. Two additional semiconductor switches 59 of TPIM 18 are not used when charging the ESS 24.

Motor 16 includes induction coils 171, 173, and 175. Inverter 23 of TPIM 18 include semiconductor switches 151, 153, 155, and 157, which together with the induction coils 171 and 173 can provide a buck-boost circuit 13 for rapid charging of the ESS 24. Two additional semiconductor switches 159 are included in the inverter 23 of TPIM 18, but as with the semiconductor switches 59 are not used for charging of the ESS 24.

Controller 26 of FIG. 1 opens the contactor 25 to initiate the charging operation, e.g., by transmitting a step signal to the contactor signaling a solenoid to open. Semiconductor switch 17 is turned on during normal vehicle operation, and is turned off by the controller 26 during the charging operation when the vehicle 10 is not running An output voltage is then generated across the ESS 24 and a parallel link capacitor 27, i.e., an electronic component which helps to filter the high-voltage DC bus bar 38 aboard the vehicle 10 shown in FIG. 1.

Figure 3:
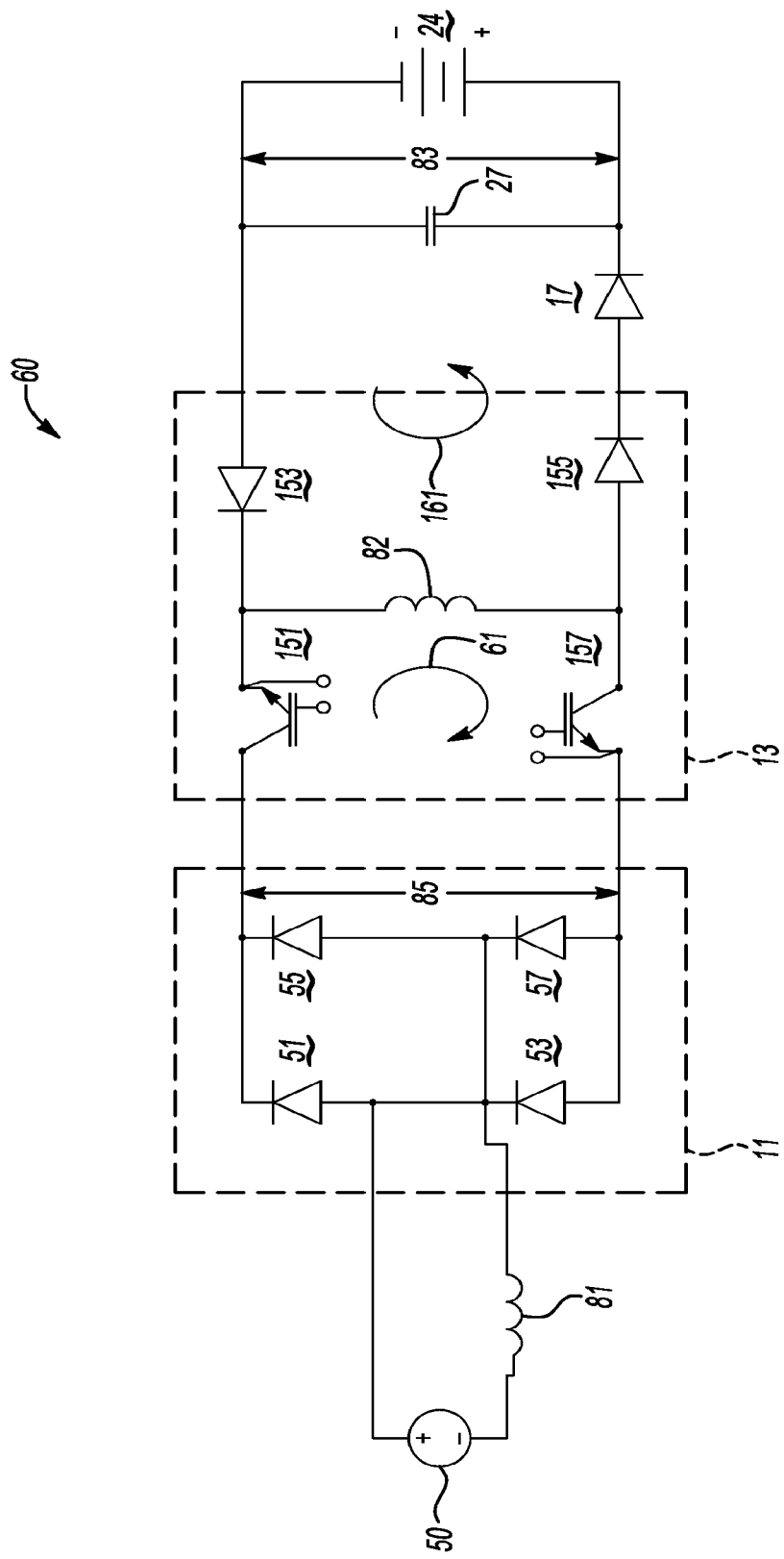
FIG. 3 is a schematic circuit diagram for an equivalent circuit to that which is represented in FIG. 2 showing a buck-boost operation for charging the ESS.

Referring to FIG. 3, an equivalent electrical circuit 60 is shown for the active components in the first topology 12 of FIG. 2 during a charging operation of the ESS 24. A boost operation is provided by buck-boost circuit 13. Only the IGBTs and diodes of certain semiconductor switches of FIG. 2 are shown separated from each other in FIG. 3 to more clearly illustrate the power flow provided during the charging operation. That is, any IGBT and diode component which is not used in the charging operation of ESS 24 is omitted from FIG. 3 for added clarity.

During the charging operation, contactor 25 (see FIG. 2) is opened, the IGBT of semiconductor switch 17 of FIG. 2 remains off, and rectified voltage ($V_{RECT}$) 85 is built up through the rectifier circuit 11 as shown in FIG. 1. During a boost operation of the buck-boost circuit 13, the IGBTs of semiconductor switches 151 and 157 are turned on for a calibrated duty cycle in one switching period. As a result, electrical current 61 flows as indicated to build energy across the induction coils 171 and 173 (see FIG. 2), with the equivalent inductance of these two induction coils represented in FIG. 3 by inductor 82.

The diode of semiconductor switch 17 prevents the ESS 24 from shorting out during the boost operation provided by buck-boost circuit 13, while the IGBTs of semiconductor switches 151 and 157 are turned on. When the IGBTs of semiconductor switches 151 and 157 are turned off for the rest of the cycle of the same switching period, an electrical current 161 is allowed to flow through the diodes of switch 153, 155 in the indicated direction, and an output voltage ($V_{OUT}$) 83 is provided across the ESS 24. The output voltage ($V_{OUT}$) 83 can be calculated as $V_{OUT}=V_{RECT}(D/(1-D))$, with D representing the duty cycle. For a boost operation, the value of D must be greater than 0.5.

Filter 30 and contactor 56 of FIG. 2 may not be needed in the first topology, as the equivalent inductance from inductor coils 71 and 73, represented as inductor 81, is large enough to eliminate any switching ripple and any other undesired current transients or spikes. Likewise, the inductor 82 noted above is large enough that a lower switching frequency of approximately 20 kHz can be used. The boost operation provided by buck-boost circuit 13 can provide a power factor correction at the input AC power supply 50 of near unity, i.e., greater than approximately 0.95.

As noted above, the two-motor drive system described herein with reference to FIGS. 2 and 3 can be used with a PHEV with no additional on-board battery charger, thereby reducing the cost and size of the powertrain. Only one contactor and one additional semiconductor switch are required, i.e., the contactor 25 and the additional semiconductor switch 17 shown in FIG. 2. Since the TPIM 18 and motors 14, 16 of FIG. 1 are already rated for high power, it follows that high power/rapid charging is made possible using semiconductor switches and induction coils from these devices.

Charging power of approximately 10 kW may be provided in one possible embodiment, a level which should not significantly degrade the useful life of the TPIM 18 and motors 14, 16. For example, TPIM 18 may be rated for approximately 85 kW to approximately 120 kW depending on the design, so power levels much higher than 10 kW are possible. However, a trade-off exists between charging power and operating life of the TPIM. Additionally, rectifier circuit 11 is a diode-full-wave rectifier, and therefore toggling of a switch pair with positive/negative cycles of the AC source 50 is not required, which further simplifies control of the topology of FIG. 2.

Figure 4:
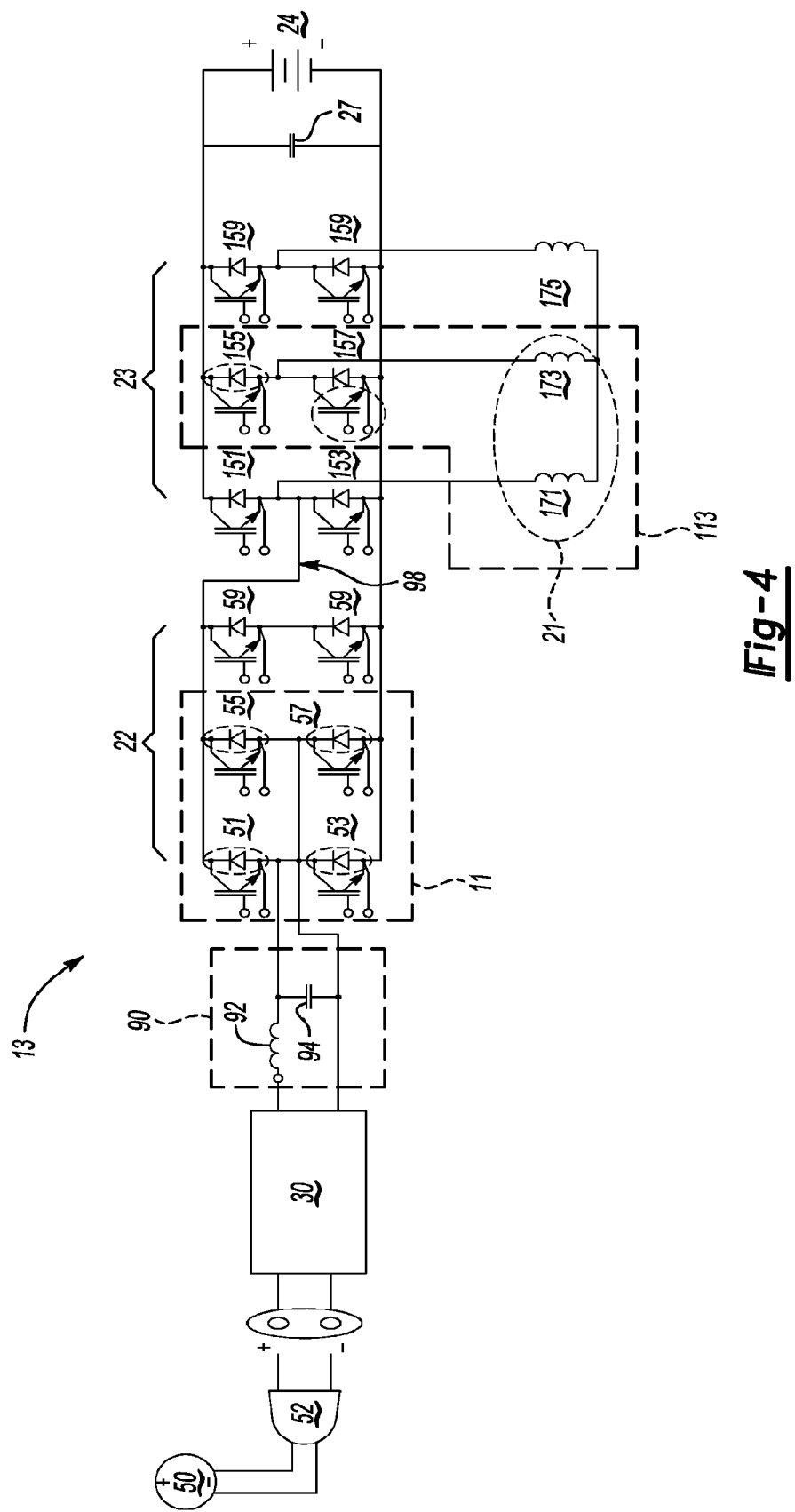
FIG. 4 is a schematic circuit diagram illustrating a second topology for charging the ESS of another possible embodiment of the vehicle shown in FIG. 1.

Referring to FIG. 4, a second topology 13 may be used with a one-motor drive system, e.g., a BEV, wherein the vehicle retains the TPIM 18 of the two-motor drive system. Although the TPIM 18 has two inverters 22, 23 (see FIG. 1), retaining the TPIM 18 for a one-motor drive vehicle configuration allows for commonality of components, i.e., fewer part numbers to stock and source, which may be of some value depending on the relative market for a PHEV relative to a BEV.

Figure 5:
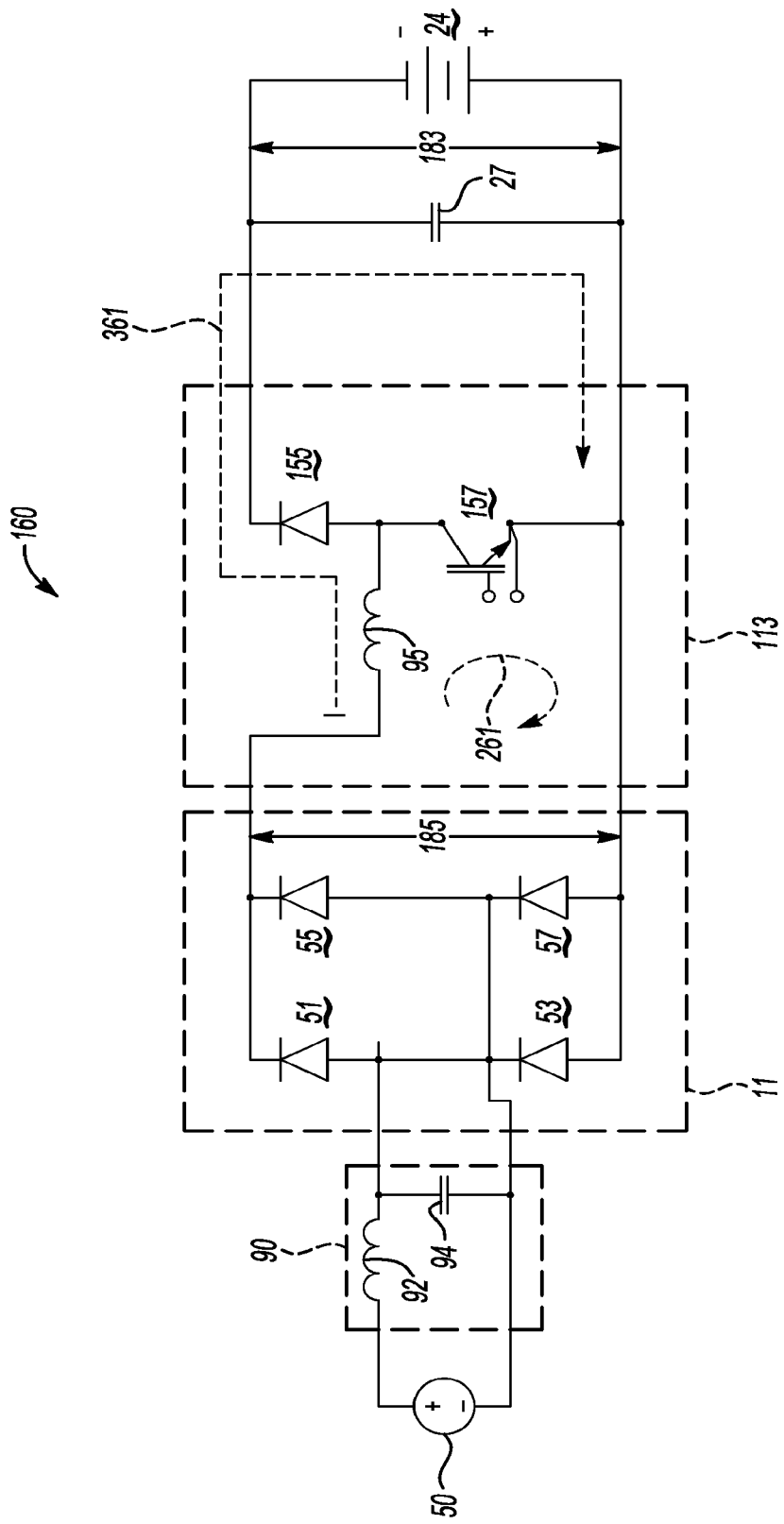
FIG. 5 is a schematic circuit diagram for an equivalent circuit to that which is represented in FIG. 4 showing a pure boost operation for charging the ESS.

Because only one motor is used, i.e., motor 16, the induction coils 20 of motor 14 are not available for use as a line filter in the one-motor drive configuration. Therefore, an additional input filter 90 can be added having an induction coil 92 and a capacitor 94, each electronic component being sized to provide the desired amount of line conditioning as understood in the art. Designated induction coils 21, i.e., the induction coils 171, 173 of motor 16, form a boost inductor, and semiconductor switches 51, 53, 55, and 57 of the TPIM 18 form the rectifier circuit 11 in the second topology. The equivalent inductance of coils 171, 173 is represented in FIG. 5 by a single inductor 95, Semiconductor switches 155 and 157 provide a pure boost circuit 113 for charging the ESS 24. Semiconductor switch 17 of the first topology 12 of FIG. 2 is not used in the second topology 13. Additionally, in the second topology 13 the high-voltage bus bar 39 of FIG. 1 is routed as indicated by arrow 98, i.e., with the output side of semiconductor switch 55 being electrically connected in between semiconductor switches 151 and 153 where one end of induction coil 171 of motor 16 is also connected. All other components remain the same relative to the first topology as set forth above.

Referring to FIG. 5, an equivalent electrical circuit 160 is shown for the charging operation of ESS 24 in a one-motor drive configuration. As with FIG. 3, FIG. 5 shows only those semiconductor switch components, e.g., IGBTs and diodes, which are active during the charging operation. When the IGBT of semiconductor switch 157 is turned on and semiconductor switch 155 is turned off, electrical current 261 flows through an inductor 95.

Inductor 95 has an inductance value equal to that of inductor coils 171 and 173 of motor 16 combined, and is large enough that lower switching frequency, e.g., approximately 20 kHz, can be used, as with the first topology 12 of FIG. 2. The energy is transferred to inductor 95 from rectified voltage (arrows 185). When the IGBT of semiconductor switch 157 is turned off, the diode of semiconductor switch 155 is turned on. As a result, electrical current 261 flowing through the inductor 95 is delivered to the link capacitor 27, as indicated by arrow 361, and output voltage 183 is provided at the ESS 24.

As a pure boost operation, the duty cycle (D) of the semiconductor switch 153 governs the output voltage, i.e., $V_{OUT}=V_{RECT}/(1-D)$. Only the additional input filter 90 and special bus bar routing indicated in FIG. 4 by arrow 98 are needed. All other benefits and features described above for the first topology otherwise apply to the second topology. Either topology provides charging power of approximately 300% to 800% of the power available from a conventional on-board battery charger module, thus greatly improving charging times. The cost and weight of the on-board charger is eliminated, with negligible decrease in the operating life of the TPIM 18 and motors 14 and/or 16 when a charging power of approximately 10 kW is used.

Figure 6:
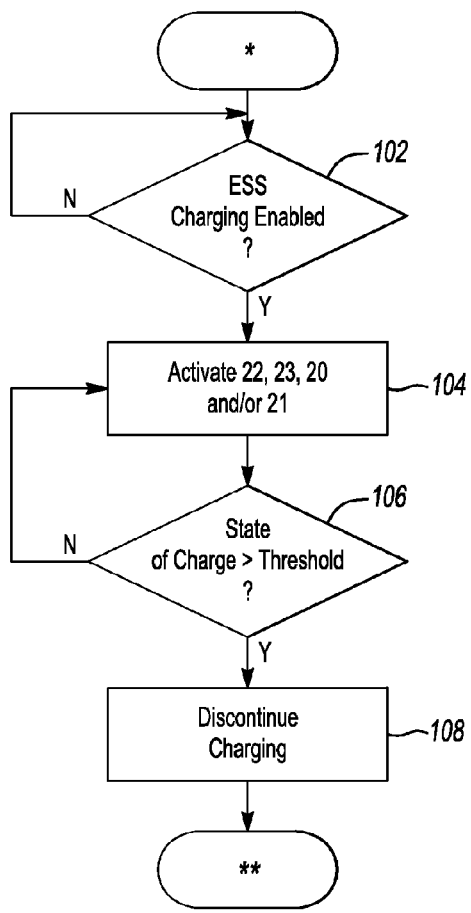
FIG. 6 is a flow chart describing a method for charging the ESS using the TPIM and one or both drive motors.

Referring to FIG. 6, charging algorithm 100 is selectively executed by controller 26 of FIG. 1 when the vehicle 10 is turned off and the AC power supply 50 of FIGS. 2 and 4 is electrically connected to the vehicle. These preliminary steps are indicated by (*) in FIG. 6. Algorithm 100 effectively begins with step 102, wherein the controller 26 evaluates a set of vehicle conditions to determine if charging of the ESS 24 is enabled. For example, controller 26 may evaluate the operating state of vehicle 10, such as by determining whether an engine is running, the ignition is on, the transmission is in gear, AC power supply 50 is plugged in, etc. In one embodiment, controller 26 may evaluate the state of charge of the ESS 24 to determine if charging is required. If the set of vehicle conditions indicates that the charging operation should not commence, algorithm 100 may repeat step 102 in a loop until the conditions indicate otherwise. When charging is enabled, algorithm 100 proceeds to step 104.

At step 104, the controller 26 activates the designated semiconductor switches of TPIM 18 and designated induction coils of motor 16 as set forth above to initiate the charging operation using these components. Induction coils of motor 14 may also be used in the two-motor drive configuration described above with particular reference to FIGS. 2 and 3. Semiconductor switch 17 and contactor 25 of FIG. 2 may also be energized or de-energized as needed by controller 26 in the two-motor drive configuration, while the filtering provided by induction coils of motor 14 may be provided by the inductor 92 and capacitor 94 shown in FIG. 4 when motor 14 is not used. Once charging commences, algorithm 100 proceeds to step 106.

At step 106, controller 26 compares the state of charge of ESS 24 to a calibrated threshold. When the state of charge exceeds the threshold, algorithm 100 proceeds to step 108, otherwise repeating steps 104 and 106 in a loop until the threshold is exceeded.

At step 108, controller 26 discontinues the charging operation by reversing the energizing steps of step 104 as explained above. Algorithm 100 is finished, as indicated by (**) in FIG. 6, and vehicle 10 is ready to use in its normal operating modes.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a high-voltage energy storage system (ESS) which is rechargeable using electrical power from an off-board AC power supply;
   a traction power inverter module (TPIM) having a first and a second inverter, with each inverter including a plurality of semiconductor switches;
   a permanent magnet/induction-type motor having a plurality of induction coils; and
   a controller operable for selectively energizing designated semiconductor switches of the plurality of semiconductor switches, and designated induction coils of the plurality of induction coils, to thereby boost the electrical power from the off-board AC power supply, thereby rapidly charging the ESS when the vehicle is not running.

2. The vehicle of claim 1, wherein the plurality of semiconductor switches includes one of an insulated-gate bipolar transistor (IGBT)-and-diode pair and a metal-oxide semiconductor field-effect transistor (MOSFET)-and-diode pair.

3. The vehicle of claim 1, wherein a rectifier circuit is formed in part using semiconductor switches from the first inverter as at least some of the designated semiconductor switches, and wherein a boost circuit is provided using semiconductor switches from the second inverter as at least some of the designated semiconductor switches and the designated induction coils of the motor.

4. The vehicle of claim 1, wherein the motor includes a first motor and a second motor, further comprising:
   a contactor which electrically connects the induction coils of the first motor to the semiconductor switches of the first inverter; and
   an additional semiconductor switch which is electrically connected between the ESS and an output side of the semiconductor switches of the second inverter;
   wherein the controller selectively activates the contactor and the additional semiconductor switch in order to boost the electrical power from the off-board AC power supply and thereby charge the ESS.

5. The vehicle of claim 1, further comprising:
   an input filter having an inductor and a capacitor, and adapted for filtering the power from the off-board AC power supply.

6. A controller for charging a high-voltage energy storage system (ESS) using electrical power from an off-board AC power supply, the controller being usable in a vehicle having the ESS, a traction power inverter module (TPIM) with a first and a second inverter, and at least one permanent magnet/induction-type motor, wherein the controller includes a host machine operable for selectively energizing designated semiconductor switches of the first and the second inverter of the TPIM and designated induction coils of the motor in order to boost the electrical power from the off-board AC power supply, thereby rapidly charging the ESS when the vehicle is not running.

7. The controller of claim 6, wherein the designated semiconductor switches of the first and the second inverters include one of an insulated-gate bipolar transistor (IGBT) and a metal-oxide semiconductor field-effect transistor (MOSFET), and wherein the controller is operable for transmitting a switching signal to the respective IGBT or MPSFET of each of the designated semiconductor switches to charge the ESS.

8. The controller of claim 6, wherein the controller energizes a boost circuit formed from the designated semiconductor switches of the second inverter and the designated induction coils of the motor to boost the electrical power from the off-board AC power supply.

9. The controller of claim 6, wherein the motor includes a first motor and a second motor, and wherein the vehicle includes a contactor adapted to electrically connect the induction coils of the first motor to the semiconductor switches of the first inverter, and further includes an additional semiconductor switch electrically connected between the ESS and an output side of the semiconductor switches of the second inverter;
   wherein the controller selectively activates the contactor and the additional semiconductor switch to boost the electrical power from the off-board AC power supply, thereby charging the ESS.

10. A method of charging a high-voltage energy storage system (ESS) aboard a vehicle having a traction power inverter module (TPIM) with a first inverter, a second inverter, and a motor electrically connected to the ESS, the method comprising:
    using designated semiconductor switches of the first inverter to produce a rectified voltage from input power supplied from an off-board AC power supply;
    using designated induction coils of the motor to generate an output voltage, wherein the output voltage is a function of the rectified voltage; and
    charging the ESS using the output voltage.

11. The method of claim 10, further comprising using a controller to control a duty cycle of one of the designated semiconductor switches of the second inverter.

12. The method of claim 10, wherein the vehicle includes a second motor, an additional semiconductor switch, and a contactor, the method further comprising:

using the contactor, designated induction coils of the second motor, and designated semiconductor switches of the first inverter to produce the rectified voltage; and activating the additional semiconductor switch to thereby transfer the rectified voltage to a link capacitor as the output voltage, thereby charging the ESS using the output voltage.

13. The method of claim 12, wherein the designated semiconductor switches each include one of an insulated-gate bipolar transistor (IGBT)-and-diode pair and a metal-oxide semiconductor field-effect transistor (MOSFET)-and-diode pair, and wherein using the contactor, designated induction coils of the second motor, and designated semiconductor switches of the first inverter to produce the rectified voltage includes using the diodes of the IGBT-and-diode pair or the diodes of the MOSFET-and-diode pair.

14. The method of claim 11, further comprising using an electromagnetic compliance filter to filter the AC power supply.

* * * * *